United States Patent
Hautala et al.

[15] 3,657,800
[45] Apr. 25, 1972

[54] FRICTION WELDED GRAPHITIC VALVE LIFTERS

[72] Inventors: Richard E. Hautala; Roy F. Kern, both of Peoria, Ill.

[73] Assignee: Caterpillar Tractor Co., Peoria, Ill.

[22] Filed: Dec. 29, 1969

[21] Appl. No.: 888,449

[52] U.S. Cl..................29/470.3, 123/90.51, 156/73, 228/2
[51] Int. Cl...........................................B23k 27/00
[58] Field of Search..............123/90.51, 90 B; 29/470.3; 228/2; 156/73

[56] References Cited

UNITED STATES PATENTS

| | | | |
|---|---|---|---|
| 3,478,411 | 11/1969 | Goloff | 29/470.3 |
| 3,477,117 | 11/1969 | Calton et al. | 29/470.3 |
| 3,473,214 | 10/1969 | Hollander | 29/470.3 |
| 3,497,942 | 3/1970 | Weiss | 29/470.3 |

Primary Examiner—John F. Campbell
Assistant Examiner—R. J. Craig
Attorney—Fryer, Tjensvold, Feix, Phillips & Lempio

[57] ABSTRACT

A method and article are provided in the form of a valve lifter assembly wherein the wear plate of graphitic alloy steel is friction welded, by means of an inertia welder, to alloy/carbon steel tube to make up the lifter assembly.

4 Claims, 3 Drawing Figures

PATENTED APR 25 1972 3,657,800
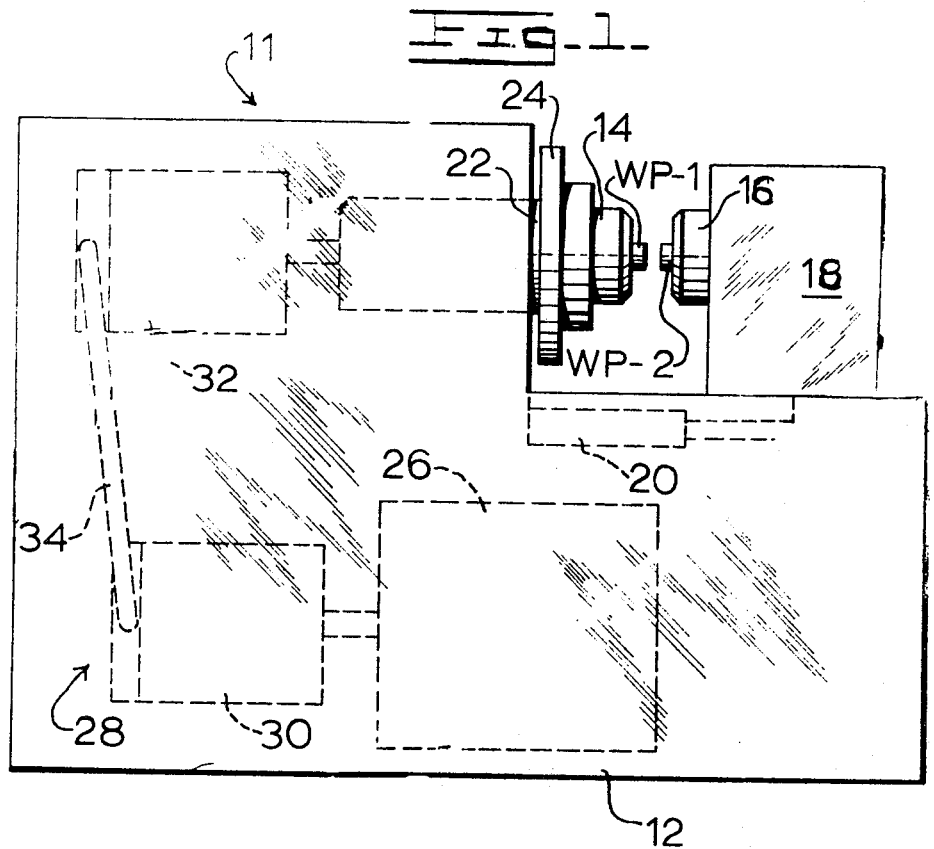
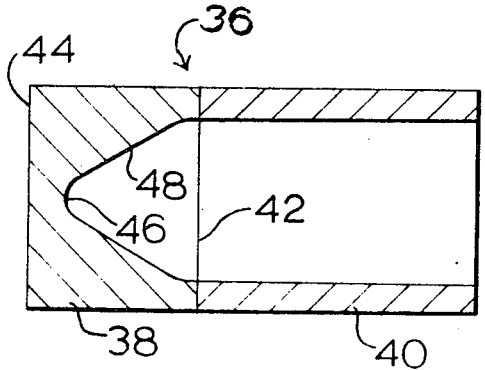
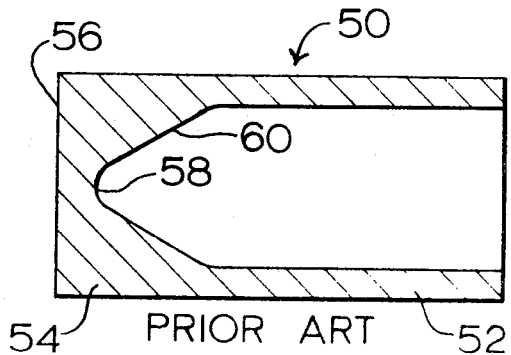
PRIOR ART
INVENTORS
RICHARD E. HAUTALA
ROY F. KERN
BY Fryer, Tjensvold, Feix, Phillips & Lempio
ATTORNEYS

FRICTION WELDED GRAPHITIC VALVE LIFTERS

BACKGROUND OF THE INVENTION

This invention relates to improvements in friction welding of the general type wherein two workpieces are subjected to relative rotation while in rubbing contact with each other to generate frictional heat to raise the workpieces to a suitable welding temperature whereupon the relative rotation subsides and the workpieces are welded together.

It is also to be understood that the invention is specifically applicable to the inertia welding process. In the inertia welding process the energy required to bring the common interface of the parts to a bondable condition is stored as kinetic energy in rotating inertia weights. These weights generally take the form of flywheels and are connected to one of the parts and the entire energy necessary to form the bond is stored in the weights prior to engagement of the parts at the interface. The stored energy is discharged into the interface through frictional heating and plastic working developed at the interface as the rubbing contact slows the rotating weights and the bonding cycle is concluded.

Present valve lifter constructions comprise one-piece construction of chilled, cast iron material. A problem has arisen in that control of the chemical composition and/or heat treatment has varied to such an extent that production of lifters with inconsistent microstructure has resulted. Inconsistent microstructure leads directly to considerable wear and scuffing of the valve lifters during engine operation. The valve lifter is placed with its end portion in contact with a camshaft, and serves to open and close the engine valves by translating the eccentric, rotational movement of the camshaft into linear movement of a push rod which, in turn, actuates a valve. The end surface of the valve lifter which is in contact with the camshaft is thus a point of extreme wear. In order to resist the wear encountered at this locality, the end surface of the valve lifter must be extremely hard and the microstructure uniform. It follows that when a valve lifter with poor microstructure is placed in an engine, wear and scuffing at the end surface will generally occur after a very short period of engine running time. Once the valve lifter begins to scuff and wear, damage to the camshaft lobe which is in contact with the lifter is also incurred. Damage to the other parts of the engine is also a possibility. In fact, the damaged valve lifter will often heat up and become stuck in its lifter guide which can result in bent or broken push rods or valves. The resultant down time and expense of repairing the engine can be very costly.

Since the above-described problem occurs frequently, a number of solutions have been proposed. One alternative is to construct the valve lifter entirely of a wear resistant material such as a graphitic alloy steel which, in the heat treated form, provides excellent wear resistance in the valve lifter application. Graphitic alloy steel also provides excellent non-seizing properties which are important since the valve lifter must reciprocate in a lifter guide. These excellent properties are attributed to the alloy carbides and graphitic particles which are distributed in the matrix of the material. Several grades of these materials are produced by various companies, such as those produced by the Steel and Tube Division of the Timken Roller Bearing Company under the product names GRAPH MO, GRAPH TUNG, and GRAPH AIR. The relatively high cost of these materials, however, precludes construction of lifters entirely of graphitic alloy steel from an economic standpoint.

One solution to the high cost of the lifters made from graphitic alloy steel would be to construct only the head portion of the more expensive material and to make the body portion of the lifter from an inexpensive, alloy/carbon steel. This would seem to be an ideal solution since the maximum amount of wear occurs at the end portion of the lifter. A problem arises, however, in joining graphitic alloy steel to alloy/carbon steel since the former steel is considered to be unweldable or at least extremely difficult to weld by common welding techniques such as arctype welding. Other techniques such as silver brazing or other types of brazing could be used, however, these techniques are considered impractical since they are rather expensive and would probably produce weak joints.

A solution to the above outlined problems is the subject of this invention. The solution takes the form of a composite valve lifter comprised of an end portion of graphitic alloy steel which is joined to a body portion of alloy/carbon steel by means of inertia, friction welding.

It is therefore the principal object of this invention to provide a method of joining graphitic alloy steel to alloy/carbon steel by using the inertia, friction welding process.

It is also an object of this invention to provide a method of producing the composite valve lifter assembly by inertia, friction welding of a tubular body member of alloy/carbon steel to a solid circular cap member of wear resistant graphitic alloy steel.

A further object of this invention is to provide a composite valve lifter assembly made from relatively expensive graphitic alloy steel and less expensive alloy/carbon steel by utilizing the inertia, friction welding process.

It is still another object of this invention to provide an improved valve lifter assembly having an end portion of wear and scuff resistant graphitic alloy steel which gives improved performance over presently used chilled, cast iron valve lifters.

Other objects and advantages of the present invention will be readily apparent from the following description and claims and/or illustrated in the accompanying drawings which, by way of illustration only, show a preferred embodiment of the present invention and the principles thereof, and what is now considered to be the best mode contemplated for applying these principles. It is recognized that other embodiments of the invention utilizing the same or equivalent principles may be attempted and structural changes may be made as desired by those skilled in the art without departing from the present invention, and the purview of the appended claims.

BRIEF DESCRIPTION OF THE DRAWINGS

FIG. 1 is a side elevation illustrating one embodiment of a friction welding machine which may be used to practice the method of the present invention;

FIG. 2 is a cross-sectional view of a valve lifter assembly of the present invention illustrating the composite nature of the device; and FIG. 3 is a cross-sectional view of a prior art valve lifter illustrating the unitary nature of the device.

DESCRIPTION OF THE PREFERRED EMBODIMENT

A friction welding machine constructed in accordance with one exemplary embodiment of the present invention is indicated generally by the reference numeral 11 in FIG. 1 of the drawing. The friction welding machine comprises a frame or housing structure generally denoted at 12 for housing the various elements that make up the machine. The two parts to be welded, workpieces WP-1 and WP-2, are mounted within chucks 14 and 16. The chucks may be of the common variety with a plurality of adjustable jaws which facilitate the gripping of the workpieces.

Chuck 16 does not rotate and is fixedly mounted on a tailstock fixture 18. Tailstock fixture 18, however, is mounted for axial movement on the machine frame 12 by means of a load cylinder 20. A pressure control circuit (not shown) regulates the pressure in the load cylinder and thus determines the force with which workpieces WP-1 and WP-2 are engaged.

Chuck 14 is mounted on a spindle 22, and the chuck and spindle are mounted for rotation within the frame 12. The rotary spindle 22 is adapted to receive flywheels 24 which may be of various sizes and masses depending upon the particular application of the machine.

An electric motor 26, rotates the spindle through a hydrostatic transmission generally indicated by the reference numeral 28. The hydrostatic transmission includes a hydraulic pump 30, and hydraulic motor 32, and a manifold 34 between the pump and motor.

The drive ratio between the motor and the spindle 22 can be varied by changing the cam angles in either the pump 30 or the motor 32. The pump and motor can be used to effectively disconnect the motor 26 from the spindle 22 by moving the cam and pump 30 to a position in which the pump 30 does not displace any hydraulic fluid to the motor 32.

It should be understood that the flywheel weights 24 are mounted on the spindle 22 in order that the welding machine 11 may be operated as an inertia welding machine as described in further detail below.

A welding operation to join a first workpiece such as a graphitic alloy steel end cap to a second workpiece such as a alloy/carbon steel body to produce a composite valve lifter assembly, can be performed by operating the machine in the following manner.

One of the workpieces, WP-1, is firmly clamped in the rotatable chuck 14 located on spindle 22. The other workpiece, WP-2, is firmly clamped in the non-rotatable chuck 16, which is located on the tailstock portion 18 of the machine. Upon actuation of the motor 26, the flywheel and workpiece WP-1 are accelerated to a predetermined velocity.

Once the predetermined velocity has been attained, the motor 26 is disconnected or shut down, and the ram mechanism 20 is actuated to move tailstock portion 18, and workpiece WP-2 into contact with the rapidly rotating workpiece WP-1. As the two workpieces are brought into contact under the upsetting pressure applied through ram 20, heat is generated at the contacting surface or interface of the workpieces. This heating increases until the workpieces reach the weld temperature, at which time the upsetting pressure applied by the ram 20, at either a constant or varying pressure, causes flashing or upsetting to occur. During this heating or flashing, the rotational velocity of the spindle member 22 has continued to decrease. At the time the rotation of the spindle ceases, upsetting has taken place and the weld is completed.

Referring now to FIG. 2, there is shown a sectional side view of the composite valve lifter assembly. The assembly generally shown at 36 comprises a tubular member 40 of alloy/carbon steel and a head or cap member 38 of graphitic alloy steel. The two members of dissimilar material are joined by the inertia welding process at interface 42. Surface 44 of assembly 36 is the contact and wear surface and spherical surface seat 46 at the apex of frusto-conical cavity 48 will accommodate a push rod as explained previously. Members 38 and 40 correspond to workpieces WP-1 and WP-2, respectively. Of course, the order may be reversed and the same result achieved. Referring now to FIG. 3, there is generally shown at 50 a prior art valve lifter of unitary, cast construction.

A generally tubular body portion 52 blends into a head portion 54. The contact and wear surface is shown at 56. Cast into the lifter is a spherical surface seat 58. This spherical surface seat is at the apex of the generally frusto-conical cavity 60. Spherical seat 58 accommodates the push rod (not shown) as previously discussed.

As can be seen from a comparison of FIGS. 2 and 3, lifter assembly 36 and prior art lifter 50 are very similar in construction with the main difference being that the prior art lifter is of one-piece construction and lifter assembly of the present invention is of two-piece, composite construction with the pieces joined by friction welding.

A friction weld between end cap 38 and body portion 40 at interface 42 is effected in the following manner. The graphitic alloy end cap 38 is inserted into one of the chucks 14, 16 and is firmly gripped by said chuck. The body portion 40 is similarly chucked in the remaining chuck. The rotatable portion 14 of the machine is then accelerated to a predetermined velocity at which time end cap 38 and body portion 40 are forced together under axial pressure by means of ram 20 in order that welding may occur at interface 42. Friction created at interface 42 causes heating which continues until a forging temperature is reached, at which time the upsetting of the materials occurs and the weld is completed as the rotating members come to rest. Pressure on ram 20 is then released, moving the fixtures apart, and the welded valve lifter assembly is removed from the chucks. Subsequent operations may be performed to remove the excess flash material which may have been extruded from the weld area and the valve lifter assembly may then be finally machined to a finished part.

Typical compositions of the graphitic alloy steels manufactured by the steel and tube division of the Timken Roller Bearing company are as follows:

|  | Graph Mo. | Graph Tung | Graph Air |
|---|---|---|---|
| Carbon | 1.45 | 1.50 | 1.35 |
| Manganese | 1.00 max. | 0.50 | 1.85 |
| Phosphorus | 0.025 max. | 0.025 max. | 0.025 max. |
| Sulphur | 0.025 max. | 0.025 max. | 0.025 max. |
| Silicon | 1.25 max. | 0.65 | 1.20 |
| Nickel |  |  | 1.85 |
| Molybdenum | 0.25 | 0.50 | 1.50 |
| Tungsten |  | 2.80 |  |

Graphitic alloy steels typically possess a carbon content in the range of approximately 1.35 per cent to 1.50 per cent.

"Alloy/carbon," as used in this discussion, is defined as including both alloy steels as well as carbon steels.

The following approximate parameters have been successfully utilized to weld graphitic alloy end caps to alloy/carbon body portions in order to make up a composite valve lifter assembly; axial pressure — 20,000 to 33,500 lbs./sq. in.; surface velocity — 1,200 to 2,000 ft./min.; energy input — 34,000 to 56,000 ft.-lbs./sq. in.

While the above illustrates the preferred embodiment of our invention, it is to be understood that this is capable of variation and modification, and we therefore do not wish to be limited to the precise details set forth, but desire to avail ourselves of such changes and alterations as fall within the purview of the appended claims.

What is claimed is:

1. A method of friction welding a first workpiece of graphitic alloy steel material to a second workpiece of alloy/carbon steel material, said method comprising the steps of effecting relative rotation of the workpieces in a surface velocity range of from approximately 1,200 to 2,000 ft./min., forcing the workpieces into frictional engagement at their common interface under a predetermined axially applied pressure of from approximately 20,000 to 33,500 lbs./sq. in., and effecting an energy transfer at the interface in the range of from approximately 34,000 to 56,000 ft.-lbs./sq.in., which concentrates heat at the interface until a bond is formed and all the input energy is expended.

2. A method as set forth in claim 1 wherein one of said workpieces is operatively associated with a rotating mass, which mass stores the requisite amount of input energy to be released at the weld interface.

3. A method of welding a first workpiece consisting of an end cap of graphitic alloy material to second workpiece consisting of a tubular body member to form a composite valve lifter comprising the steps of:
effecting a relative rotation of the workpieces in a surface velocity range of from 1,200 to 2,000 ft./min.;
forcing the workpieces into frictional engagement at their common interface under a predetermined axially applied pressure in a range of from approximately 20,000 to 33,500 lbs./sq.in.; and
effecting an energy transfer at the interface which concentrates heat at the interface until a bond is formed and all the input energy is expended.

4. A method as claimed in claim 3 wherein the energy transfer is in a range of from approximately 34,000 to 56,000 ft.-lbs./sq.in.

* * * * *